Jan. 26, 1932.   O. K. KJOLSETH   1,842,973
LOAD COUPLING ARTICULATION
Filed Dec. 12, 1930
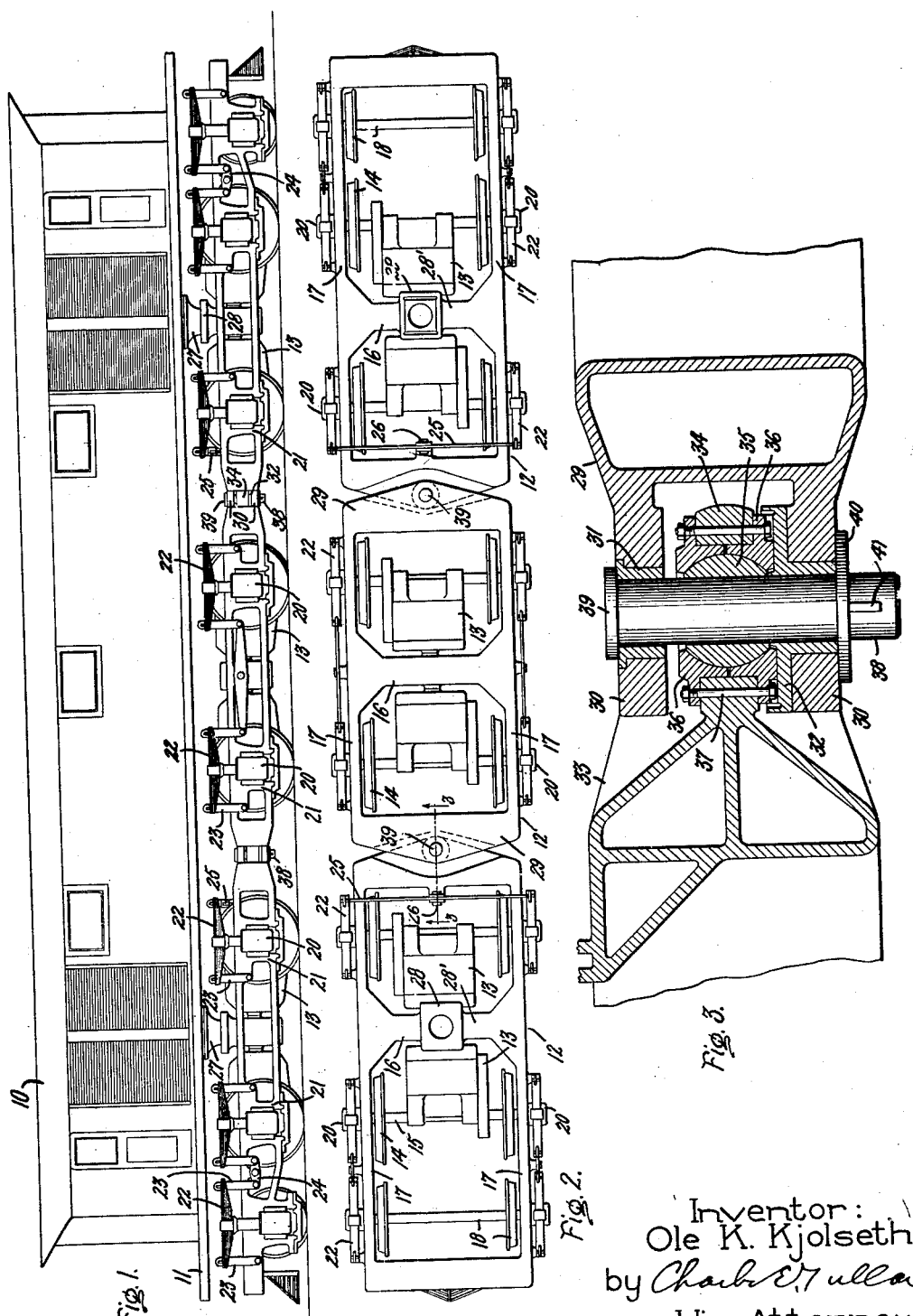
Inventor:
Ole K. Kjolseth,
by Charles E. Tullar
His Attorney.

Patented Jan. 26, 1932

1,842,973

UNITED STATES PATENT OFFICE

OLE K. KJOLSETH, OF ERIE, PENNSYLVANIA, ASSIGNOR TO GENERAL ELECTRIC COMPANY, A CORPORATION OF NEW YORK

LOAD COUPLING ARTICULATION

Application filed December 12, 1930. Serial No. 501,919.

My invention relates to a load coupling articulation for locomotives or cars.

In current practice a locomotive or car having more than two articulated trucks in connection with its driving mechanism usually has some means for distributing part of the load on the end trucks and part on the intermediate trucks. This is often accomplished by supporting the weight directly on each truck, but this type of construction has the disadvantage of requiring the supports on the intermediate trucks being constructed for lateral motion and having a system of equalization with the end trucks to provide sufficient flexibility to the construction so that the locomotive or car can easily take curves in the track without liability of derailment.

The object of my invention is to provide a simplified and improved means for distributing the load on all the drivers of a locomotive or car which uses more than two articulated trucks in connection with its driving mechanism and to provide a construction which will easily take curves in the track without liability of derailment. I accomplish this object by providing in combination with a car frame, more than two articulated trucks and means supporting the superstructure of the locomotive or car on the trucks at both ends and provide means for coupling the articulated trucks and transmitting load therebetween.

My invention will be better understood from the following description referring to the accompanying drawings and the features of novelty which characterize my invention will be pointed out with particularity in the claims appended to and forming a part of this specification.

In the drawings, Fig. 1 is a side elevation of an electric locomotive having an articulated truck construction embodying my invention; Fig. 2 is a plan view of Fig. 1 with the locomotive superstructure removed; and Fig. 3 is an enlarged sectional view on line 3—3 of Fig. 2 showing the construction of the unitary coupling and load transferring means at the articulation of the trucks.

Referring to the drawings, an electric locomotive cab 10 is mounted on a supporting frame 11 and is provided with three articulated trucks 12. The locomotive is propelled by a pair of motors 13 on each truck which are connected to driving wheels 14 through axles 15, and suspended from transoms 16 joining the parallel side members 17 of the truck frames. The end trucks are also provided with guiding wheels and axles 18. The truck frames have pedestals 21 which engage journal boxes 20 on the truck axles and are supported thereon by a side spring rigging including semi-elliptical springs 22 connected by spring hangers 23 to equalizers 24 and to the truck side frame members 17.

In accordance with my invention the end trucks are each provided on their inner ends with a transverse equalizer 25 connecting the side springs on both sides of the truck on this end and being pivoted at the middle by pivot 26 to the truck end frame. The frame 11 is supported by two pivotal body center plates 27 on truck center plates 28, one on each of the end trucks. The truck center plates are supported by transoms 28' of the end truck frames so that part of the weight of the superstructure acting on the end trucks is transmitted to the middle truck by articulated supporting couplings so as to distribute the weight on the three trucks and thereby obtain the desired distribution of load among the driving wheels.

The construction of these articulated hinged supporting couplings is more clearly shown in Fig. 3. The end frames 29 of the middle truck are formed with yokes or sills 30 extending laterally thereof and having vertically extending openings therethrough on the longitudinal center line of the truck. The opening in the upper portion of yoke 30 is provided with a bearing 31 and the opening in the lower portion thereof with a bearing plate 32, each having an opening therein vertically aligned with each other. The inner end frame 33 of each of the end trucks is provided with a tongue 34 extending laterally thereof and formed to fit loosely within the yoke 30 of the end frame of the middle truck and resting on the bearing plate 32 for transferring a portion of the load from the end trucks to the middle truck. These tongues 34 include bearings 35 having an opening therein and journalled in split bearing housing members 36 which are secured within an opening in the tongue and fastened together and to the tongue by bolts 37. A coupling pin 38 extends through the aligned openings in the yoke bearings 31 and 32 and through the opening in the tongue bearing 35, thereby pivotally coupling together the trucks. The coupling pins 38 are formed with heads 39 and provided with retaining plates 40 and pins 41.

Thus it is seen that I have provided a unitary means of coupling together the articulated trucks and of distributing the load between them and providing sufficient flexibility to the construction by the use of the two pivotal end supports for the superstructure and a pivotal coupling together of the trucks so that the locomotive or car can easily pass around curves without liability of derailment.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. In combination with a locomotive or car, a supporting frame, more than two articulated trucks, each of said trucks having a plurality of wheels and axles and a truck frame supported on said wheels and axles, means including pivotal supports for said car frame on the end trucks independently of the other trucks, and means including a pivotal coupling and a thrust bearing coaxial with said coupling for transmitting load between said trucks.

2. In combination with a locomotive or car having a supporting frame, more than two articulated trucks, each of said trucks having wheels and axles and a truck frame supported on said axles, adjacent trucks including a yoke on one of said trucks and a tongue on the other fitting loosely within said yoke, means including a pivotal connection and a thrust bearing coaxial therewith for connecting said tongues and yokes, and means for pivotally supporting said car frame on said end trucks independently of the other trucks so as to distribute the weight of said car frame through said coupling on all of the trucks.

3. In combination with a locomotive or car having a supporting frame, more than two articulated trucks, each of said trucks having wheels and axles and a frame, means including a side spring suspension system and a cross-equalizer joining the side spring system adjacent the inner ends of the end trucks and fulcrumed thereon for supporting said truck frame on said axles, and means for pivotally supporting said car frame on the end trucks independently of the other trucks and a combined pivotal and vertical thrust coupling for said trucks for distributing the weight on all of the trucks.

In witness whereof I have hereunto set my hand this 10th day of December, 1930.

OLE K. KJØLSETH.